United States Patent

Tani et al.

[11] Patent Number: 5,821,193
[45] Date of Patent: *Oct. 13, 1998

[54] ADSORBENT HAVING A TERMINAL HYDRAZINE GROUP AND A METHOD FOR REMOVING KETOAMINE-CONTAINING PROTEIN

[75] Inventors: Nobutaka Tani, Osaka; Eiji Ogino, Kobe, both of Japan

[73] Assignee: Kanegafuchi Kagaku Kogyo Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 557,092
[22] PCT Filed: Apr. 6, 1995
[86] PCT No.: PCT/JP95/00683
    § 371 Date: Dec. 6, 1995
    § 102(e) Date: Dec. 6, 1995
[87] PCT Pub. No.: WO95/27559
    PCT Pub. Date: Oct. 19, 1995

[30] Foreign Application Priority Data

Apr. 8, 1994 [JP] Japan .................................. 6-071161

[51] Int. Cl.$^6$ .......................... B01J 20/00; C12N 11/06; A23J 1/00
[52] U.S. Cl. .................. 502/401; 502/402; 502/403; 502/400; 210/656; 210/692; 210/690; 435/180; 435/182; 530/413; 530/415
[58] Field of Search ............................ 502/401, 403, 502/402, 405, 400; 210/656, 692, 690; 435/180, 182; 530/413, 415

[56] References Cited

U.S. PATENT DOCUMENTS 3,947,352 3/1976 Cuatrecasas et al. ..................... 210/31
4,419,444 12/1983 Quash .......................................... 435/7

FOREIGN PATENT DOCUMENTS

| 62-142114 | 6/1987 | Japan . |
| 2-156 | 1/1990 | Japan . |
| 6-312134 | 11/1994 | Japan . |
| WO90/08172 | 7/1990 | WIPO . |
| WO92/03732 | 3/1992 | WIPO . |

OTHER PUBLICATIONS

Yoshihei, Diabetes and Renovascular Arteria, Practice, 3, pp. 298–302 (1986).
Relationship between Diabetes and Blood Vessel, The Bulletin of the Japan Diabetes Society General Meeting, 1, pp. 1–5 (1988).
Brownlee et al, Annals of Internal Medicine, 101, pp. 527–537 (1984).
Makita et al, The New England Journal of Medicine, vol. 325, No. 12, pp. 836–842 (1991).
Experiment and Application, Affinity Chromatography, pp. 16–95 Kodansha (1976).
Acharya et al, The Journal of Biological Chemistry, vol. 225, No. 15, pp. 7218–7224 (1980).
Brownlee et al, The New England Journal of Medicine, vol. 318, No. 20, pp. 1315–1321 (1988).

*Primary Examiner*—Glenn Caldarola
*Assistant Examiner*—In Suk Bullock
*Attorney, Agent, or Firm*—Birch, Stewart, Kolasch & Birch, LLP

[57] ABSTRACT

An adsorbent for removing ketoamine-containing protein, which comprises carrying a compound having a terminal functional group of the formula:

$$-(R^1)_x-\underset{R^2}{N}-\underset{H}{N}-H$$

wherein each of $R^1$ and $R^2$ is an organic group and X is 0 or 1, on a porous water-insoluble carrier, a process for removing ketoamine-containing protein by employing the above adsorbent, a process for preventing or treating for diabetic complication by removing ketoamine-containing protein with the above adsorbent and an adsorber for removing ketoamine-containing protein.

21 Claims, 2 Drawing Sheets

1 INLET
2 OUTLET
3 ADSORBENT FOR REMOVING KETOAMINE-CONTAINING PROTEIN
4,5 FILTER
6 COLUMN
7 ADSORBER FOR REMOVING KETOAMINE-CONTAINING PROTEIN

ADSORBENT HAVING A TERMINAL HYDRAZINE GROUP AND A METHOD FOR REMOVING KETOAMINE-CONTAINING PROTEIN

TECHNICAL FIELD

The present invention relates to an adsorbent for removing ketoamine-containing protein, more particularly, it relates to an adsorbent for removing ketoamine-containing protein in body fluid, a process for removing ketoamine-containing protein by using the above-mentioned adsorbent, a process preventing or treating for diabetic complications by removing ketoamine-containing protein with the adsorbent and an adsorber for ketoamine-containing protein.

BACKGROUND ART

After a few years have passed since a patient exhibits the onset of diabetes, in most of all the cases, a pathologic change in kidney glomerula appears. Most of the causes of death of diabetics also are due to nephropathy, and recently, a ratio of a patient with renal insufficiency which is caused due to diabetic nephropathy has been increasing. This is due to angiopathy occured in kidney glomerula (ref. Diabetes and Renovascular Arteria, PRACTICE, 3, 298 (1986) and Relationship between Diabetes and Blood Vessel, The Bulletin of the Japan Diabetes Society General Meeting, 1 (1988)).

Although there is present a large amount of sugar present in the blood of a diabetic, compared to a normal adult, it is known that glucose which is present in blood bonds to protein and the like without participation of an enzyme. Protein binds to sugar nonenzymatically to form ketoamine-containing protein, then, the ketoamine-containing protein deposits on the vessel wall, and, as a result, causes angiopathy. This leads to serious diabetic complications. Also, a substance which is obtained by a reaction between ketoamine-containing protein is formed. These are known as Advanced Glycosylation End Products (AGEs). AGEs are substances wherein glycosylated proteins are cross-linked to each other, and has been considered as a causative substance of diabetic complication (ref. Nonenzymatic Glycosylation and the Pathogenesis of Diabetic Complications; Annals of Internal Medicine, 101, 527 (1984) and Advanced Glycosylation End Products in Patients with Diabetic Nephropathy; The New England Journal of Medicine, 325, 836 (1991)).

Although a treatment for diabetic complication currently depends on a vigorous insulin therapy or a depressor therapy, once clinically apparent nephropathy progresses, it is difficult to halt the progression of the disease. Alternatively, as to non-insulin dependent diabetes mellitus, there is not an effective treatment for the disease at this time.

In the field of food, the fact that sugar adds to protein to give a saccharificated protein, has been known for a long time, and a lot of attempts to inhibit glycation have been carried. For example, in the publications, Japanese Unexamined Patent Publication No. 142114/1987 and Japanese Unexamined Patent Publication No. 156/1990, which were filed with Japanese Patent Office by The Rockefeller University, the fact that addition of a composition containing hydrazine or aminoguanidine to desired protein shows an effect inhibiting glycation of the protein is described. This fact shows that a compound dissolved in an aqueous solution inhibits glycation of protein.

A hydrazide derivative and the like have been employed for carrying a ligand in affinity chromatography for a long time (ref. Experiment and Application, Affinity Chromatography: Kodansha (1976)). For example, there is a method wherein a hydrazide derivative which is carried on a carrier is allowed to react with a compound (ligand) containing a carboxyl group in the presence of carbodiimide, and furthermore, to react with the aldehyde group of ring-cleaved sugar to fix sugar as a ligand. But the hydrazide derivative-carrying carrier has been used as an adsorbent for affinity. A condition which allows the hydrazide derivative-carrying carrier (adsorbent) to react with aldehyde group needs a higher reaction temperature, a longer reaction time and a larger amount of an aldehyde compound and the like in comparison with a condition being used in extracorporeal circulation (ref. Experiment and Application, Affinity Chromatography: 65 to 79, Kodansha (1976)). This is due to the purpose of the above-mentioned method, that the aldehyde compound and the like are fixed on a carrier. It is extremely unsuitable to allow the synthetic condition of such adsorbent to apply to a condition of adsorption, and therefore, a purpose of adsorption cannot be accomplished at all. It is easily presumed that the reactivity of a carbonyl group of a ketoamine is inferior to that of an aldehyde group, and, as a result, a more severe condition such as raising the reaction temperature or prolonging the reaction time is required. It is impossible, therefore, to adsorb ketoamino group efficiently by employing a hydrazide group.

A quantitative process for a carbonyl group involving reacting phenylhydrazine with a carbonyl compound to form precipitation has been known for a long time, and an analytical process for a ketoamine by using that process has been studied (ref. J. Biol. Chem., 255 (15), 7218 (1980)). However, although the purpose of the above-mentioned study is solved by allowing ketoamine present in the reaction system to bond to phenylhydrazine at a certain rate (for instance, only 1%), there is no description about what extent of ketoamine present in the reaction system reacts with phenylhydrazine. To the inventors of the present invention the extent of the reaction is problematic, and furthermore it is often experienced in the field of the art that a reaction carried out in a solution can be more efficient than that in solid phase-liquid phase and alternatively a reaction which occurs in a solution does not occur in solid phase-liquid phase.

There is a strong possibility that amine in protein forms ketoamine, a part of the ketoamine has a hydrophobic property, hydrophobic bond occurs, and, as a result, the part of ketoamine is wrapped in the inside of the protein. It seems reasonable to assume that, in the case of phenylhydrazine being in a solution, it can react with an inside ketoamine of a protein, but in the case of phenylhydrazine present in solid phase, only the outside part of the protein present in liquid phase can make contact with it. This suggests that the invention of an adsorbent wherein a reaction site is a ketoamine is not easily achieved. Therefore, a safe and inexpensive adsorbent for treatment in extracorporeal circulation, which can efficiently remove a large amount of ketoamine-containing protein existing in body fluid of patient with diabetic complication is desired.

DISCLOSURE OF THE INVENTION

The present invention relates to

1. An adsorbent for removing ketoamine-containing protein, which comprises carrying a compound having a terminal functional group of the formula:

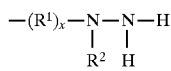

wherein each of $R^1$ and $R^2$ is an organic group and X is 0 or 1, on a porous water-insoluble carrier, 2. A process for removing ketoamine-containing protein, which comprises contacting the adsorbent for removing ketoamine-containing protein of claim 1 with body fluid having ketoamine-containing protein, 3. A process for preventing or treating for diabetic complication by removing ketoamine-containing protein with the adsorbent, and 4. An adsorber for removing ketoamine-containing protein, wherein a container which has an inlet and an outlet for fluid and is equipped with a means preventing the adsorbent for removing ketoamine-containing protein from effusing outside of the container, is charged with the adsorbent for removing ketoamine-containing protein of claim 1.

In the present invention, the term "body fluid" means blood, plasma, serum, ascites, lymph, fluid within articular cavity, a constituent of a fraction obtained therefrom and other liquid constituents derived from a living body. The term "ketoamine" means the partial structure having the formula:

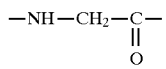

and a substance which is formed by saccharificating protein. The term "ketoamine-containing protein" in the present invention means all the denatured substances which are obtained by binding the amino group of a protein in a living body with a reducing sugar nonenzymatically. Those substances include a substance wherein sugar is added to protein to form a Schiff base, a substance which forms ketoamine by Amadori rearrangement and a substance which is obtained by cross-linking the above-mentioned substances to each other (ref. Advanced Glycosylation End Products in Tissue and the Biochemical Basis of Diabetic Complications, The New England Journal of Medicine, 318, 1315 (1988)). The inventors consider that the more ketoamine contained in a protein, the more reaction sites in the protein and as a result the protein has high pathogenicity.

In the search for a compound which is effective for adsorbing ketoamine-containing protein, as a result of fixing various compounds to a carrier and examining the effects thereof, it has been found that a compound having a terminal functional group of the formula:

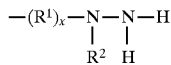

wherein each of $R^1$ and $R^2$ is an organic group and X is 0 or 1, was effective for adsorbing ketoamine-containing protein. And in accordance with the above-mentioned inference, the more protein contains ketoamine, the higher the efficiency of adsorption was.

While each of a compound of the formula:

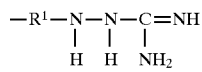

and a compound of the formula:

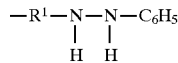

show almost no ability to adsorb ketoamine-containing protein, and therefore, it was found that a terminal —$NH_2$ group is important to adsorb ketoamine-containing protein.

Alternatively, an introduction of a proper substituent group into the second nitrogen atom from the terminal does not give a great influence, so that $R^2$ of a group of the formula:

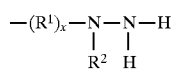

may be any an organic group unless $R^2$ hinders the terminal —$NH_2$ sterically, and generally a substituent group is hydrogen atom or a substituent group containing 1 to 20 carbon atoms is used.

Furthermore, it is preferable that a bond between the second nitrogen atom from the terminal and the carbon atom neighboring inside of the above nitrogen atom is single bond, and the above neighboring carbon atom has a saturated bond or a bond between the above neighboring carbon atom and the other carbon atom is unsaturated bond. For example, each of hydrazone of the formula:

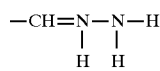

and hydrazide of the formula:

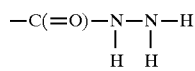

has low effect of adsorption, while as shown in a group of the formula:

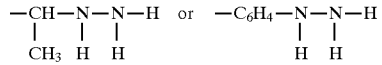

in case a bond between the second nitrogen atom from the terminal and the carbon atom neighboring inside of the above nitrogen atom is single bond, and the above neighboring carbon atom has a saturated bond or a bond between the above neighboring carbon atom and the other carbon atom is unsaturated bond, efficiency of adsorption is high.

In other words, $R^1$ such as the formula:

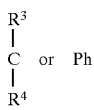

wherein Ph is

-continued

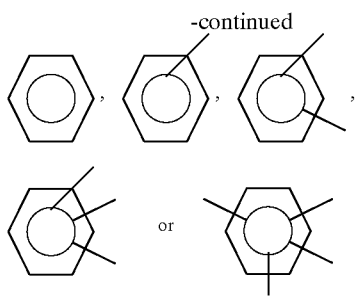

each of $R^3$ and $R^4$ is hydrogen atom, hydroxyl group, amino group or a substituent group having 1 to 20 carbon atoms, is preferable, and $R^1$ such as $CH_2$, $CH(CH_3)$, $C(CH_3)_2$, CHOH, $C(OH)CH_3$, $CHCH_2CH_3$, $C(OH)CH_2CH_2CH_3$, $C(NH_2)CH_3$,

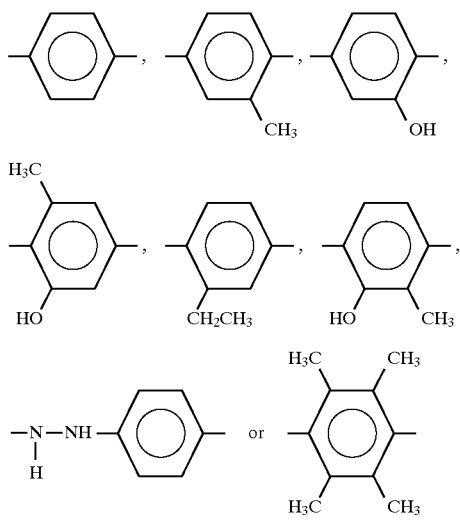

is more preferable and $R^1$ such as $CH_2$, $CH(CH_3)$, $C_6H_4$, $NH-NH-C_6H_4$ or $C(CH_3)_2$ is particularly preferable.

$R^2$ may be any substituent group which binds to nitrogen atom by a single bond, and $R^2$ having a substituent group of the formula:

—H,

—$C_nH_{2n+1}$,

—$C_nH_{2n}OC_mH_{2m+1}$,

—$C_nH_{2n}OC(=O)C_mH_{2m+1}$,

—$C_nH_{2n}NHC(=O)C_mH_{2m+1}$,

—$C_nH_{2n}C(=O)OC_mH_{2m+1}$,

—$C_nH_{2n}C(=O)NHC_mH_{2m+1}$,

—$C_nH_{2n}SC_mH_{2m+1}$,

—$C_nH_{2n}OH$,

—$C_nH_{2n}NH_2$,

—$C_nH_{2n}NHC_mH_{2m+1}$ or

—$C_nH_{2n}N(C_mH_{2m+1})_2$ wherein each of n and n+m is an integer of 1 to 20, has particularly high ability to adsorb ketoamine-containing protein. $R^2$ such as H, $C_nH_{2n+1}$, $C_nH_{2n}OC_mH_{2m+1}$, $C_nH_{2n}OH$, $C_nH_{2n}NH_2$, wherein each of n and n+m is an integer of 1 to 20, is more preferable, and $R^2$ such as H, $CH_3$, $CH_2CH_3$, $C_{16}H_{33}$, $CH_2OH$, $CH_2CH_2OH$, $CH_2NH_2$, $CH_2CH_2NH_2$ or $CH_2OCH_3$ is particularly preferable.

Therefore, as a terminal functional group used in the present invention, $R^1$ such as $CH_2$, $CH(CH_3$, $C(CH_3)_2$,

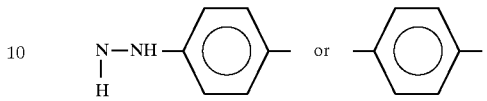

is preferable and as a $R^2$, a combination of the above-mentioned functional groups is preferable, and $R^2$ such as

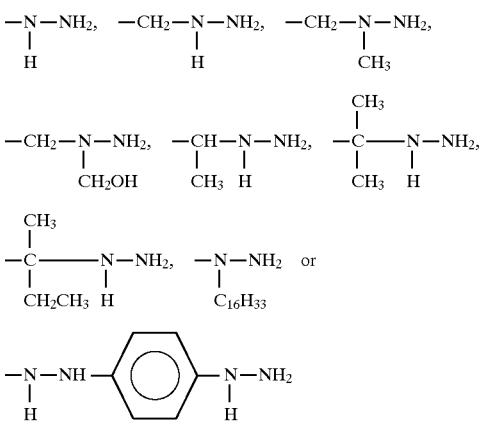

is particularly preferable.

Those compounds may be used alone or a combination of two or more kinds of those compounds may be used.

At least 10 μmol (per a volume of 1 ml of a sedimented water-insoluble carrier) of a compound having a terminal functional group of the formula:

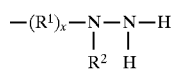

is required to be carried on the carrier, because the ability of the compound to adsorb is low, if at most 10 μmol of the compound is carried on the carrier.

As a water-insoluble carrier used in the present invention, there are an inorganic carrier such as glass beads or silica gel; a synthetic polymer such as crosslinked-polyvinyl alcohol, crosslinked-polyacrylate, crosslinked-polyacryl amide or crosslinked-polystyrene and an organic carrier which comprises of polysaccharide such as crystalline cellulose, crosslinked-cellulose, crosslinked-agarose or crosslinked-dextran, furthermore, a composite carrier obtained from a combination of the above-mentioned compounds such as organic-organic carrier and organic-inorganic carrier. Particularly, a hydrophilic carrier is preferable, because nonspecific adsorption on hydrophilic carrier is relatively poor and good selectivity of adsorption for ketoamine-containing protein can be obtained.

The term "hydrophilic carrier" used in the present invention means a carrier which has at most 60 degrees of contact angle of a compound which constitutes the carrier with water, in case the compound is allowed to form a flat plate. As a representative example of such a carrier, there are a carrier comprised of polysaccharide such as cellulose, chitosan, Sepharose or dextran, and a carrier comprised of polyvinyl alcohol, hydrolyzed poly(ethylene-vinyl acetate), polyacrylamide, poryacrylic acid, polymethacrylic acid, poly methyl methacrylate, polyacrylic acid-grafting polyethylene, polyacrylamide-grafting polyethylene or glass.

Particularly, a carrier wherein a OH group is present is excellent in ability for adsorption and selectivity and a carrier comprised of porous cellulose gel is one of the most preferable carriers employed in the present invention, because porous cellulose gel has the following excellent properties:

1. The gel has relatively high mechanical strength and toughness, and as a result of such properties the gel is hardly destroyed or produce fine dividing powder by an operation such as stirring, and when the gel is charged with a column, the gel is not consolidated or clogged up by passing body fluid through the column at high flow rate, furthermore, the structure of pore thereof hardly changes by high-pressure steam sterilization,
2. The gel is comprised of cellulose, so that the gel is hydrophilic, the gel has a large amount of hydroxyl groups which can be employed for bonding ligand and nonspecific adsorption is scarcely caused,
3. The gel has relatively high strength, even if volume of porosity thereof is enlarged, thus capacity of adsorption thereof which is not inferior to that of a soft gel is obtained and
4. Safety of the gel is higher as compared with that of a synthetic polymer gel and the like. The present invention is not limited to only those carriers. Further, those carriers may be used alone or a mixture of two or more kinds of those carriers may be used.

A property firstly required for a water-insoluble carrier is that the carrier have many pores having a proper size, namely, that the carrier is porous. As ketoamine-containing protein which is an object of adsorption of the adsorbent in the present invention is a nonenzymatically glycosylated protein, the molecular weight of the protein is over a wide range and is not determined. In order to adsorb ketoamine-containing, protein efficiently, it is preferable that ketoamine-containing protein can penetrate into pores of a carrier at a certain high probability, but the other protein does not penetrate, if possible.

Although mercury porosimetry is most frequently employed for measuring a pore size, in the porous water-insoluble carrier used in the present invention, it is mostly impossible to apply the mercury porosimetry. Therefore, it is proper to employ an exclusion limit as a measure of the pore size of the gel. The term "exclusion limit" means the minimum molecular weight of the molecule which cannot penetrate into a pore (i.e. the molecule is excluded) in a gel permeation chromatograph (ref. Hiroyuki Hatano and Toshihiko Hanai, Experimental High Speed Liquid Chromatography, Kagaku Dojin). Although the exclusion limit for globular proteins, dextran or polyethylene glycol has been studied, in the carrier used in the present invention, exclusion limit is suitably measured by employing globular protein.

As the result of the investigation using carriers having various exclusion limits, it is found that a pore size suitable for adsorbing ketoamine-containing protein is at least $2 \times 10^4$ of the exclusion limit. Thus, in the case of using a carrier having less than $2 \times 10^4$ of the exclusion limit, the amount of adsorbing and removing ketoamine-containing protein is low and practicability of the carrier declines. Therefore, a preferable exclusion limit of the carrier used in the present invention is at least $2 \times 10^4$.

In the case of using a carrier having an exclusion limit more than $5 \times 10^6$ serious trouble is not caused so long as applying plasma or serum as a body fluid to the carrier, but a macro molecule having no interaction with ligand tends to physically close the binding site of ligand, and to decrease the amount of effective ligand.

Furthermore, in the case of applying blood as a body fluid to a carrier, when the exclusion limit of the carrier is over $5 \times 10^6$, the rate of adhesion of platelets tends to increase, and when the adsorbent of the present invention is applied to a DHP (direct blood perfusate) type of hemocatharsis system, the adsorbent cannot always demonstrate enough capability. While, in the case of an exclusion limit of at most $5 \times 10^6$ of exclusion limit, a serious trouble is not caused by any usage, thus in order to provide the carrier with flexibility of usage, an exclusion limit of at most $5 \times 10^6$ is preferable.

The following is a porous structure of the carrier. In view of the ability of adsorption per unit volume, a structure uniformly having pores at any part of the gel is more preferable than a structure having pores only on the surface of the gel. It is preferred that the pore volume of the gel is at least 20% and that the specific surface area of the gel is at least 3 $m^2$/g. The form of the carrier can be selected from any type of form such as granular, fibrous or hollow type.

Furthermore, it is suitable for fixing ligand if a functional group which can be used for fixing reaction of ligand is present on the surface of the carrier. As a representative example of those functional groups, there is hydroxyl group, amino group, aldehyde group, carboxyl group, thiol group, a silanol group, amide group, epoxy group, a halogen, succinylimide group and an acid anhydride group.

As a carrier used in the present invention, there can be used any one of a hard carrier and a soft carrier, in order to use the carrier for extracorporeal circulation treatment it is important that the gel does not clog up when the carrier is charged with a column and a liquid is passed through the column. Therefore, the gel is required to have sufficient mechanical strength. Thus it is more preferable that the carrier used in the present invention is a hard carrier. The term "hard carrier" used in the present invention means, for instance, in case that a gel is granulated gel as shown in Reference Example, the carrier wherein a relationship between pressure loss $\Delta P$ and flow rate is linear relationship up to 0.3 $kg/cm^2$ of pressure loss when a cylindrical column is charged with the gel and aqueous fluid is passed through the column. The adsorbent of the present invention is obtained by fixing a compound having a terminal functional group of the formula:

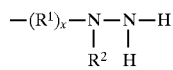

on a porous water-insoluble carrier. As a method of fixation, various methods which are widely known can be employed without particular limitation.

However, since the adsorbent of the present invention is used for extracorporeal circulation treatment, it is important to suppress desorption and elution of ligand in sterilization or treatment to the utmost from a safety point, thus fixation by using covalent bonding is preferable.

There are various processes for removing ketoamine-containing protein by using the adsorbent of the present invention. The most simple and easy process is a method which comprises taking out blood containing ketoamine-containing protein, storing the blood in a blood bag, mixing the adsorbent of the present invention thereto, removing ketoamine-containing protein, then removing the adsorbent through a filter and returning the blood into the body. This process does not require complicated apparatus, but has a disadvantage that the amount of blood treated in one treatment is little, thereby the treatment needs long time and the procedure becomes complicated.

Another process is a process which comprises charging the adsorbent with a column, incorporating into extracorporeal circulation cycle and carrying out adsorbing for removal on-line. There are processes for treatment such as a process which comprises a direct perfusion of whole blood, and a process which comprises separating plasma from blood and then passing the plasma through a column. The adsorbent of the present invention can be applied to any process of the above-mentioned and is the most suitable for on-line treatment.

In the extracorporeal circulation cycle described in the present specification, the adsorbent of the present invention can be used alone or in combination with the other extracorporeal circulation treatment system. As an example of the combination, there is a combination with artificial dialysis cycle, and then, the combination can also be used for hemodialysis therapy.

An adsorber for removing ketoamine-containing protein of the present invention with the adsorbent for removing ketoamine-containing protein is more specifically explained referring to FIG. 1 which is schematic cross section of an Example.

In FIG. 1, 1 represents an inlet for body fluid; 2 represents an outlet for body fluid; 3 represents an adsorbent for removing ketoamine-containing protein of the present invention; 4 and 5 represent a means (filter) for preventing the adsorbent from flowing out, thereby body fluid and a compornent contained in body fluid can pass but the adsorbent for removing ketoamine-containing protein cannot pass; 6 represents a column; and 7 represents an adsorber for removing ketoamine-containing protein. A shape and material of the container of the above-mentioned adsorber are not particularly limited. As a preferable example, there is a cylindrical column with about 150 to about 400 ml of capacity and about 4 to about 10 cm of diameter.

BEST MODE FOR CARRYING OUT THE INVENTION

The adsorbent of the present invention is more specifically described and explained by means of the following Examples. The present invention is not limited to Examples.

Reference Example

Each of the cylindrical glass column equipped with the filters having pore size of 15 $\mu$m at both ends thereof (inside diameter: 9 mm, length of the column: 150 mm) was charged uniformly with agarose gel (BIO-GEL A-5m made by Bio-Rad Laboratories, Inc., a particle size: 50 to 100 meshes), vinyl polymer gel (TOYOPEARL HW-65 made by TOSOH Corporation, a particle size: 50 to 100 $\mu$m) and cellulose gel (CELLULOFINE GC-700m made by Chisso Corporation, a particle size: 45 to 105 $\mu$m), and the relationship between flow rate and pressure loss $\Delta P$ was determined by passing water through each of the column using Peristatic pump. The results are shown in FIG. 2.

Figure 1:
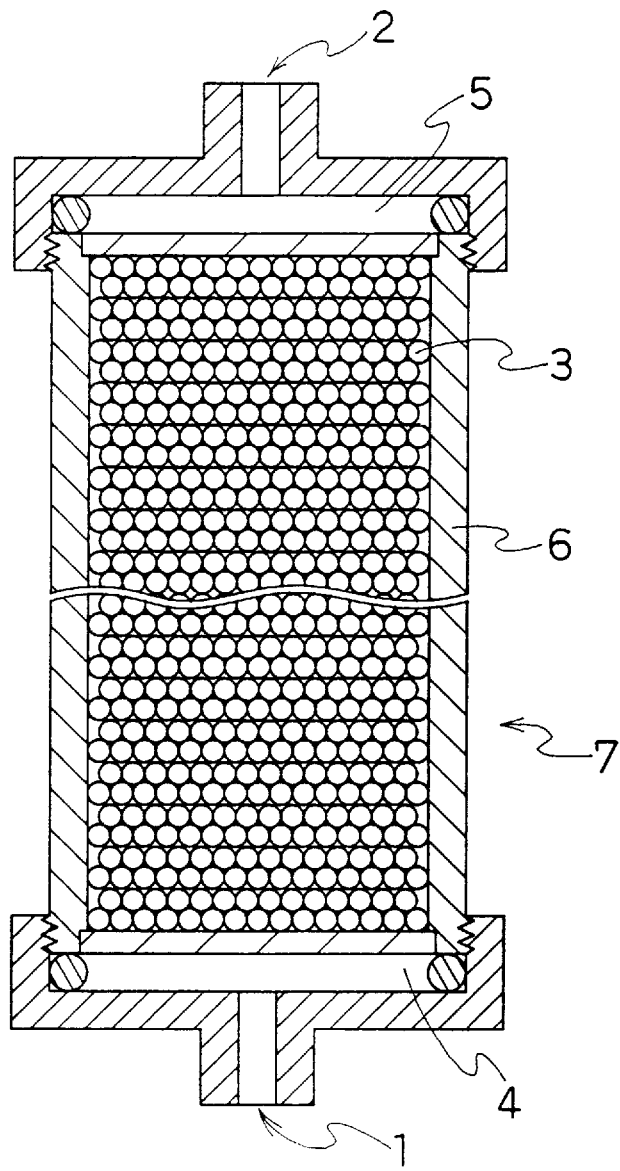
FIG. 1 is a schematic cross section of an Example of the adsorber for removing ketoamine-containing protein of the present invention.
Figure 2:
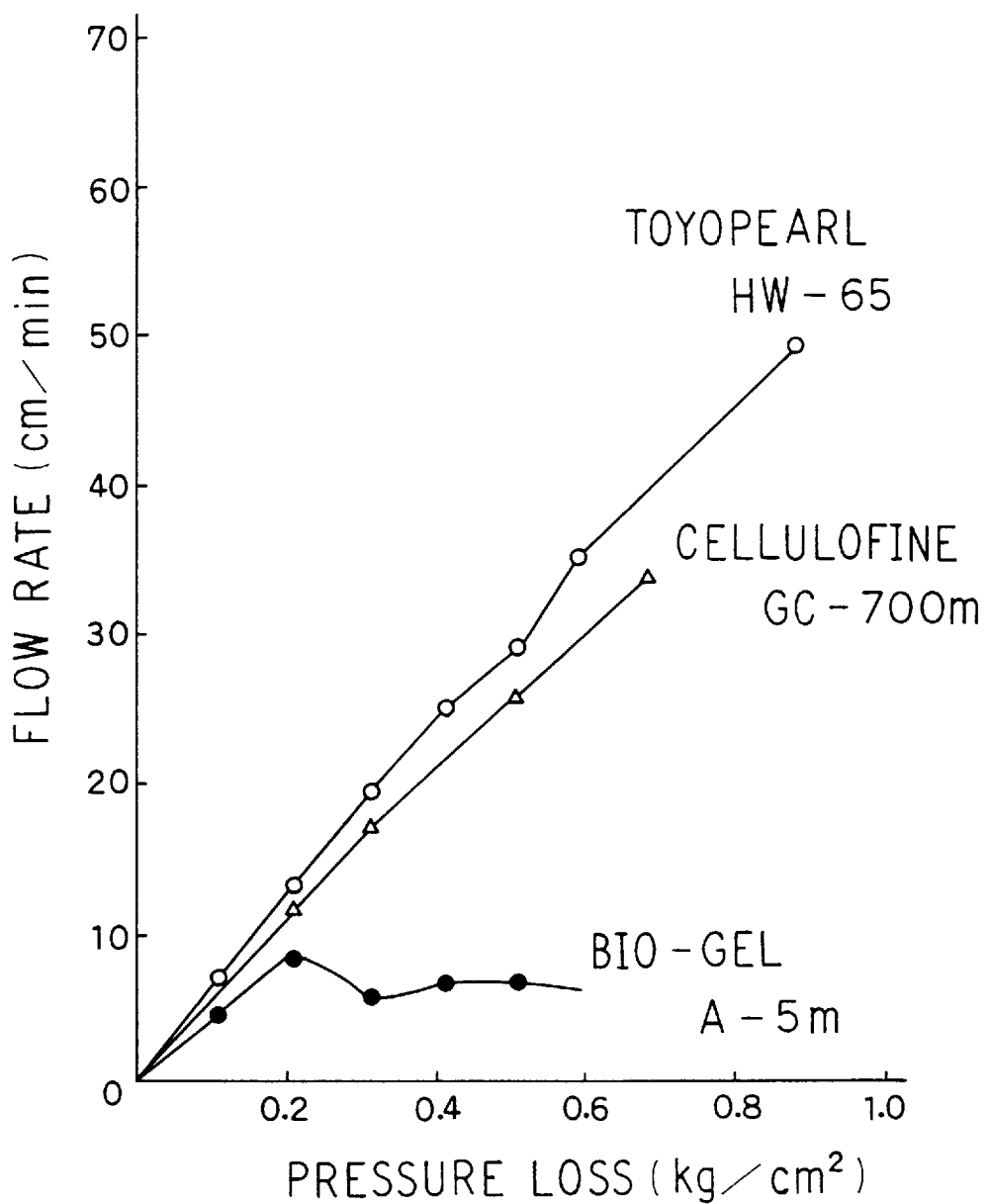
FIG. 2 is a graph showing the result of the relationship between flow rate and pressure loss examined by employing three kinds of gels.

As shown in FIG. 2, it is found that each flow rate in TOYOPEARL HW-65 and CELLULOFINE GC-700m increases in nearly propotion to increase of pressure, but BIO-GEL A-5m is consolidated and the flow rate thereof does not increase in propotion to the increase of pressure. In the present invention, the gel wherein the relationship between pressure loss $\Delta P$ and flow rate is linear relationship up to 0.3 kg/cm$^2$, as the former, is defined as "hard gel".

EXAMPLE 1

Into 90 ml of GC-700m which is a cellulose porous hard gel (made by Chisso Corporation, exclusion limit of globular protein: 4×10$^5$) was added water to give a 180 ml total volume. Thereto was added 60 ml of 2M sodium hydroxide and the temperature thereof was set at 40° C. Then, thereto was added 21 ml of epichlorohydrin and this was allowed to react with stirring for 1 hour at 40° C. After the reaction was completed, the obtained mixture was fully washed with water to give an epoxidated gel.

Into 90 ml of the above epoxidated gel was added a solution wherein 300 mg of hydrazine hydrate was diluted with 20 ml of water, and the obtained mixture was left for 20 hours at room temperature and then the mixture was washed with a sufficient amount of water to give a hydrazine-fixing gel (adsorbent).

According to a conventional method, the determination of an amount of ligand was carried out: employing trinitrobenzenesulfonic acid (TNBS). Into 1 ml of each adsorbent was added each of saturated solution of sodium borate (5 g/20 ml, 250 $\mu$l, 210 $\mu$mol) and then the amount of ligand was calculated by using the amount of decrease in absorbance determined at 250 nm.

By reference to the reference (ref. Journal of Biological Chemistry, 255 (15), 7218–7224 (1980)), 400 mg of bovine serum albumin (BSA) (made by SIGMA CHEMICAL, COMPANY, FRACTON V) and 7 mg of glyceraldehyde (made by WAKO PURE CHEMICAL INDUSTRIES, LTD.) were dissolved in 6 ml of phosphate buffer solution (pH 7.4) (made by DAINIPPON PHARMACEUTICAL CO., LTD.), and the obtained mixture was warmed at 37° C. for 20 hours to prepare ketoamine-introducing BSA.

Into 0.5 ml of the adsorbent was added 1.0 ml of ketoamine-introducing BSA solution and the obtained mixture was shaken at 37° C. for 2 hours. After shaking, each amount of ketoamine in supernatant solution and in stock solution was determined as an amount of fructosamine by using ROCHE II (made by Nippon Roche K.K.), and a rate of adsorption was calculated. The result is shown in Table 1.

EXAMPLE 2

In 5 ml of phosphate buffer solution (pH 7.4) were dissolved 350 mg of bovine serum albumin and 350 mg of glucose (made by WAKO PURE CHEMICAL INDUSTRIES, LTD.), and the obtained mixture was warmed at 37° C. for 20 days to prepare sacharification BSA.

The procedure of Example 1 was repeated except for employing glycation BSA instead of ketoamine-introducing BSA, and then an amount of fructosamine was determined. The result is shown in Table 1.

EXAMPLE 3

The procedure of Example 1 was repeated with the adsorbent synthesized in Example 1 except for employing plasma of diabetic instead of ketoamine-introducing BSA, and then an amount of fructosamine was determined. The results is shown in Table 1.

EXAMPLE 4

The procedure of Example 1 was repeated except for employing methylhydrazine instead of hydrazine hydrate to give a methylhydrazine-fixing gel (adsorbent). The experiment of adsorption was performed with that adsorbent, according to the same procedure as described in Example 1. The result is shown in Table 1.

EXAMPLE 5

According to the reference (ref. J. Org. Chem., 14, 813 (1949)), buthylhydrazine was obtained from butylamine. The procedure of Example 1 was repeated except for employing butylhydrazine instead of hydrazine hydrate to give a butylhydrazine-fixing gel (adsorbent).

The experiment of adsorption was performed with that adsorbent, according to the same procedure as described in Example 1. The result is shown in Table 1.

EXAMPLE 6

The procedure of Example 5 was repeated except for employing cetylamine instead of butylamine to give cetylhydrazine. The procedure of Example 1 was repeated except for employing cetylhydrazine instead of hydrazine hydrate to give a cetylhydrazine-fixing gel (adsorbent). The experiment of adsorption of Example 1 was repeated with that adsorbent. The result is shown in Table 1.

EXAMPLE 7

The procedure of Example 1 was repeated except for employing GCL-200m which is cellulose porous hard gel (made by Chisso Corporation, exclusion limit of globular protein after ligand was fixed: $3 \times 10^6$) as a carrier to give a hydrazine-fixing gel (adsorbent). The experiment of adsorption of Example 1 was repeated with that adsorbent.

The result is shown in Table 1.

EXAMPLE 8

The procedure of Example 1 was repeated except for employing GC-100m which is a cellulose porous hard gel (made by Chisso Corporation, exclusion limit molecular weight of globular protein after ligand was fixed: $3 \times 10^4$) as a carrier to give a hydrazine-fixing gel (adsorbent). The adsorption experiment of Example 1 was repeated with that adsorbent. The result is shown in Table 1.

EXAMPLE 9

SEPACOL MINI PP (made by SEIKAGAKU CORPORATION) which is a small polypropylene column was charged with 1 ml of the methylhydrazine-fixing gel obtained in Example 4, and 6 ml of plasma of a diabetic was passed through the column. The flow rate of the plasma was controlled with a peristalic pump to give a flow rate of about 0.1 ml/min. The amount of fructosamine in the effluent was determined by the same procedure of Example 1. The result is shown in Table 1.

EXAMPLE 10

The procedure of synthesis of epoxidated gel in Example 1 was repeated except for employing 25 ml of 2M sodium hydroxide and 8 ml of epichlorohydrin to give epoxy-activating gel, and to give hydrazine-fixing gel. The experiment of adsorption of Example 1 was, furtheremore repeated with the ketoamine-introducing BSA solution.

EXAMPLE 11

The procedure of Example 5 was repeated except for employing p-phenylenediamine instead of butylamine to give p-phenylenedihydrazine.

The procedure of Example 1 was repeated except for employing p-phenylenediamine instead of hydrazine hydrate to give p-phenylenedihydrazine-fixing gel (adsorbent). The experiment of adsorption of Example 1 was repeated with that adsorbent. The result is shown in Table 1.

EXAMPLE 12

According to the reference (ref. Tetrahedron, 20, 225 (1964)), the procedure of Example 1 was repeated except for employing diglycidylether of the formula:

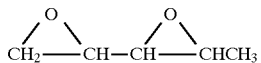

which was derived from 1,3-pentadiene, instead of epichlorohydrin to fix a hydrazine derivative having the group of the formula:

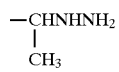

and then, to give the hydrazine derivative-immobilizing gel (adsorbent).

The experiment of adsorption of Example 1 was repeated with that adsorbent. The result is shown in Table 1.

COMPARATIVE EXAMPLE 1

The procedure of Example 1 was repeated except for employing aminoguanidine instead of hydrazine hydrate to give a aminoguanidine-fixing gel. The experiment of adsorption of Example 1 was repeated with that adsorbent. The result is shown in Table 1.

COMPARATIVE EXAMPLE 2

The procedure of Example 1 was a repeated except for employing GCL-90m which was cellulose porous hard gel (made by Chisso Corporation, exclusion limit of globular protein after a ligand was fixed: $1.5 \times 10^3$) as a carrier to give a hydrazine-fixing gel. The experiment of adsorption of Example 1 was repeated with that adsorbent. The result is shown in Table 1.

COMPARATIVE EXAMPLE 3

The procedure of Example 4 was repeated except for employing GCL-90m which was a cellulose porous hard gel of cellulose (made by Chisso Corporation, exclusion limit of globular protein after a ligand was fixed: $1.5 \times 10^3$) as a carrier to give a methylhydrazine-fixing gel. The experiment of adsorption of Example 9 was repeated with that adsorbent. The result is shown in Table 1.

TABLE 1

| Ex. No. | Compound employed for fixation ($\mu$ mol/ml-gel) | Carrier (Exclusion limit) | Adsorbate | Rate of adsorption of ketoamine-containing protein (%) |
|---|---|---|---|---|
| 1 | Hydrazine (40) | GC - 700 m (400,000) | Ketoamine-introducing BSA | 55 |
| 2 | Hydrazine (40) | GC - 700 m (400,000) | Saccharificated BSA | 35 |
| 3 | Hydrazine (40) | GC - 700 m (400,000) | Plasma of patient | 15 |
| 4 | Methylhydrazine (45) | GC - 700 m (400,000) | Ketoamine-introducing BSA | 60 |
| 5 | Butylhydrazine (15) | GC - 700 m (400,000) | Ketoamine-introducing BSA | 50 |
| 6 | Cetylhydrazine (10) | GC - 700 m (400,000) | Ketoamine-introducing BSA | 30 |
| 7 | Hydrazine (25) | GCL - 2000 m (3,000,000) | Ketoamine-introducing BSA | 50 |
| 8 | Hydrazine (30) | GC - 100 m (30,000) | Ketoamine-introducing BSA | 35 |
| 9 | Methylhydrazine (45) | GC - 700 m (400,000) | Plasma of patient | 15 |
| 10 | Hydrazine (15) | GC - 700 m (400,000) | Ketoamine-introducing BSA | 40 |
| 11 | $NH_2NHC_6H_4NHNH_2$ (25) | GC - 700 m (400,000) | Ketoamine-introducing BSA | 30 |
| 12 | $—CH(CH_3)NHNH_2$ (20)* | GC - 700 m (400,000) | Ketoamine-introducing BSA | 35 |
| Com. Ex. 1 | Aminoguanidine (35) | GC - 700 m (400,000) | Ketoamine-introducing BSA | 20 |
| Com. Ex. 2 | Hydrazine (35) | GCL - 90 m (15,000) | Ketoamine-introducing BSA | <5 |
| Com. Ex. 3 | Methylhydrazine (20) | GCL - 90 m (15,000) | Plasma of patient | <5 |

*Structure of fixed-ligand

INDUSTRIAL APPLICABILITY

The present invention can provide an adsorbent which is available at low cost and can adsorb and remove efficiently ketoamine-containing protein in body fluid.

We claim:

1. An adsorbent for removing ketoamine-containing protein, which comprises:

a compound having a terminal functional group of the formula:

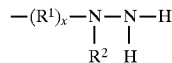

wherein $R^1$ is a group of the formula:

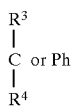

wherein Ph is a group of the formula:

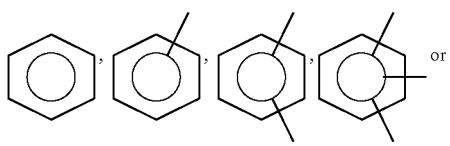

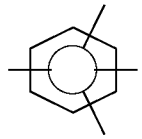

and each of $R^3$ and $R^4$ is a hydrogen atom, hydroxyl group, amino group or a substituent group having 1 to 20 carbon atoms; $R^2$ is a hydrogen atom or a substituent group having 1 to 20 carbon atoms; and X is 0 or 1, provided that said terminal functional group is not $—C(=O)NHNH_2$; and a porous water-insoluble carrier having said compound carried thereon.

2. An adsorbent for removing ketoamine-containing protein, which comprises:

a compound having a terminal functional group of the formula:

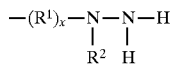

wherein $R^1$ is a group of the formula:

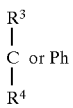

wherein Ph is a group of the formula:

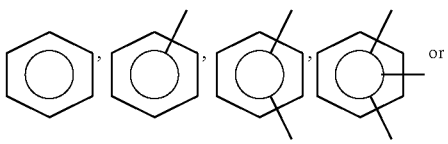

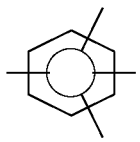

and each of $R^3$ and $R^4$ is a hydrogen atom, hydroxyl group, amino group or a substituent group having 1 to 20 carbon atoms; $R^2$ is a hydrogen atom or a substituent group having 1 to 20 carbon atoms; and X is 0 or 1, wherein a bond between the second nitrogen atom from the terminal end and a carbon atom neighboring inside of the second nitrogen atom is a single bond and wherein the neighboring carbon atom has a saturated bond; and a porous water-insoluble carrier having said compound carried thereon.

3. An adsorbent for removing ketoamine-containing protein, which comprises:

a compound having a terminal functional group of the formula:

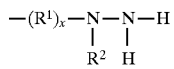

wherein $R^1$ is a group of the formula:

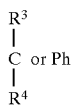

wherein Ph is a group of the formula:

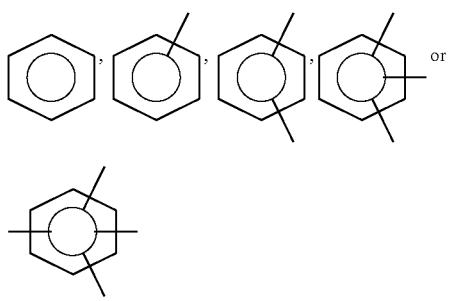

and each of $R^3$ and $R^4$ is a hydrogen atom, hydroxyl group, amino group or a substituent group having 1 to 20 carbon atoms; $R^2$ is a hydrogen atom or a substituent group having 1 to 20 carbon atoms; and X is 1; and a porous water-insoluble carrier having said compound carried thereon.

4. A method for removing ketoamine-containing protein, comprising:

contacting an adsorbent comprising a compound having a terminal functional group of the formula

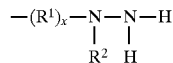

wherein $R^2$ is a hydrogen atom or an organic group and $R^1$ has a structure selected from the formula

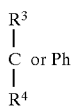

wherein each of $R^3$ and $R^4$ is a univalent organic group and Ph is

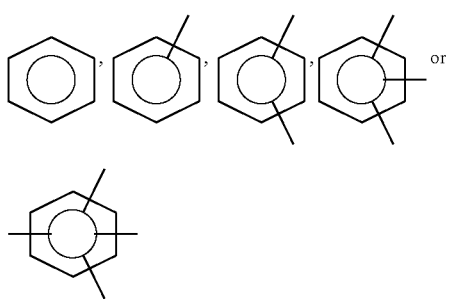

wherein the substituents of Ph can be any organic group, and X is 0 or 1, and a porous water-insoluble carrier, wherein a bond between the second nitrogen atom from the terminal end and a carbon atom neighboring inside of the second nitrogen atom is a single bond and wherein the neighboring carbon atom has a saturated bond, with a body fluid containing ketoamine-containing protein; and removing ketoamine-containing protein from said body fluid.

5. The adsorbent for removing ketoamine-containing protein of claim 1, wherein said porous water-insoluble carrier is hydrophilic.

6. The adsorbent for removing ketoamine-containing protein of claim 1, wherein a terminal functional group of —OH is present in said porous water-insoluble carrier.

7. The adsorbent for removing ketoamine-containing protein of claim 1, wherein said porous water-insoluble carrier has an exclusion limit of from $2\times10^4$ to $5\times10^6$.

8. The adsorbent for removing ketoamine-containing protein according to claim 1, wherein $R^2$ is a substituent group selected from the group consisting of —H, —$C_nH_{2n+1}$, —$C_nH_{2n}OC_mH_{2m+1}$, —$C_nH_{2n}OC(=O)C_mH_{2m+1}$, —$C_nH_{2n}NHC(=O)C_mH_{2m+1}$, —$C_nH_{2n}C(=O)OC_mH_{2m+1}$, —$C_nH_{2n}C(=O)NHC_mH_{2m+1}$, —$C_nH_{2n}SC_mH_{2m+1}$, —$C_nH_{2n}OH$, —$C_nH_{2n}NH_2$, —$C_nH_{2n}NHC_mH_{2m+1}$ and —$C_nH_{2n}N(C_mH_{2m+1})_2$, wherein each of n and n+m is an integer of 1 to 20.

9. The adsorbent for removing ketoamine-containing protein according to claim 1, wherein $R^1$ has a structure selected from $CH_2$, $CH(CH_3)$, $C(CH_3)_2$, $CHOH$, $C(OH)CH_3$, $CHCH_2CH_3$, $C(OH)CH_2CH_2CH_3$, $C(NH_2)CH_3$,

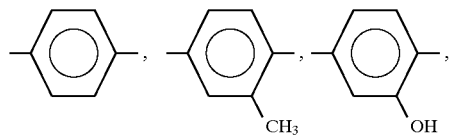

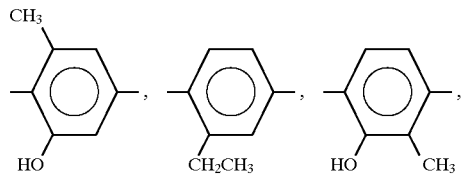

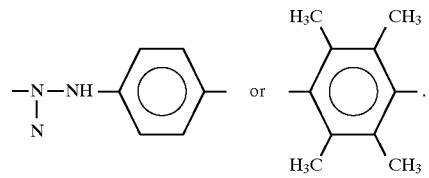

10. The adsorbent for removing ketoamine-containing protein according to claim 1, wherein $R^1$ has structure selected from $CH_2$, $CH(CH_3)$, $C_6H_4$, NH—NH—$C_6H_4$ or $C(CH_3)_2$.

11. The adsorbent for removing ketoamine-containing protein according to claim 1, wherein the compound has a terminal function group selected from

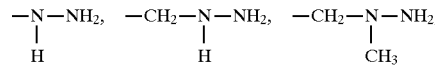

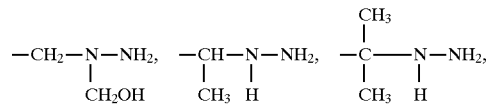

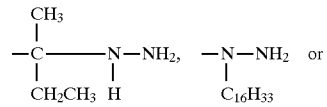

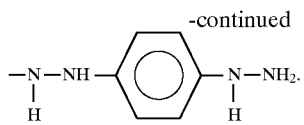

12. A method for removing ketoamine-containing protein, which comprises:

contacting the adsorbent for removing ketoamine-containing protein of claims 1 or 3 with a body fluid containing ketoamine-containing protein; and removing ketoamine-containing protein from said body fluid.

13. A method for preventing or treating a diabetic complication, which comprises:

contacting the adsorbent for removing ketoamine-containing protein of claims 1, 2 or 3 with a body fluid containing ketoamine-containing protein; and removing ketoamine-containing protein from said body fluid.

14. An adsorber for removing ketoamine-containing protein, comprising:

a container which has an inlet and an outlet for fluid and is equipped with a means preventing the adsorbent for removing ketoamine-containing protein from effusing outside of the container; and the adsorbent for removing ketoamine-containing protein of claims 1, 2 or 3.

15. The method according to claim 4, wherein each of $R^3$ and $R^4$ is selected from the group consisting of a hydrogen atom, a hydroxyl group, an amino group and a substituent group having 1 to 20 carbon atoms.

16. The method according to claim 4, wherein $R^2$ is a hydrogen atom or a substituent group having 1 to 20 carbon atoms.

17. The method according to claim 4, wherein a bond between the neighboring carbon atom and another carbon atom is an unsaturated bond.

18. The method according to claim wherein 4, wherein $R^2$ is a substituent group selected from the group consisting of —H, —$C_nH_{2n+1}$, —$C_nH_{2n}OC_mH_{2m+1}$, —$C_nH_{2n}OC(=O)C_mH_{2m+1}$, —$C_nH_{2n}NHC(=O)C_mH_{2m+1}$, —$C_nH_{2n}C(=O)OC_mH_{2m+1}$, —$C_nH_{2n}C(=O)NHC_mH_{2m+1}$, —$C_nH_{2n}SC_mH_{2m+1}$, —$C_nH_{2n}OH$, —$C_nH_{2n}NH_2$, —$C_nH_{2n}NHC_mH_{2m+1}$ and —$C_nH_{2n}N(C_{m2m+1})_2$, wherein each of n and n+m is an integer of 1 to 20.

19. The method according to claim 4, wherein $R^1$ has a structure selected from $CH_2$, $CH(CH_3)$, $C(CH_3)_2$, $CHOH$, $C(OH)CH_3$, $CHCH_2CH_3$, $C(OH)CH_2CH_2CH_3$, $C(NH_2)$

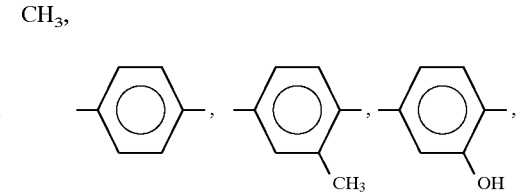

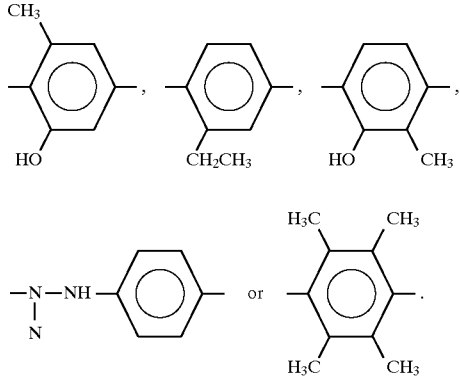

20. The method according to claim 19, wherein $R^1$ has structure selected from $CH_2$, $CH(CH_3)$, $C_6H_4$, $NH—NH—C_6H_4$ or $C(CH_3)_2$.

21. The method according to claim 4, wherein the compound has a terminal function group selected from

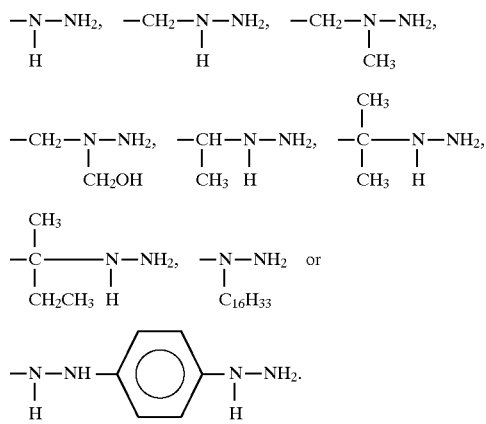

* * * * *